United States Patent
Park et al.

(10) Patent No.: US 7,929,085 B2
(45) Date of Patent: Apr. 19, 2011

(54) LIQUID CRYSTAL DISPLAY DEVICE AND METHOD OF FABRICATING THE SAME

(75) Inventors: Sung Il Park, Daegu-si (KR); Young Sik Kim, Gyeongsangbuk-do (KR); Sung Jin Park, Daegu-si (KR)

(73) Assignee: LG Display Co., Ltd., Seoul (KR)

( * ) Notice: Subject to any disclaimer, the term of this patent is extended or adjusted under 35 U.S.C. 154(b) by 1155 days.

(21) Appl. No.: 11/640,986

(22) Filed: Dec. 19, 2006

(65) Prior Publication Data

US 2008/0002128 A1    Jan. 3, 2008

(30) Foreign Application Priority Data

Jun. 30, 2006    (KR) .................. 10-2006-0060086

(51) Int. Cl.
*G02F 1/133*    (2006.01)

(52) U.S. Cl. ................. 349/116; 349/43; 349/110

(58) Field of Classification Search .............. 349/43, 349/143, 149, 151, 110, 106, 138, 116, 38; 348/602, 294; 313/507; 257/232
See application file for complete search history.

(56) References Cited

U.S. PATENT DOCUMENTS

| | | | |
|---|---|---|---|
| 2003/0231161 A1* | 12/2003 | Yamaguchi | 345/102 |
| 2005/0082968 A1* | 4/2005 | Choi et al. | 313/506 |

* cited by examiner

*Primary Examiner* — Thoi V Duong
(74) *Attorney, Agent, or Firm* — McKenna Long & Aldridge LLP

(57) ABSTRACT

Provided is a liquid crystal display device. The liquid crystal display device includes: a first substrate and a second substrate each having a display area and a non-display area defined; a liquid crystal layer between the first and second substrates; a light sensor on the first substrate in the non-display area that senses the intensity of external light; a passivation layer on an entire upper surface of the first substrate including the light sensor; and a dummy electrode on the passivation layer at a location corresponding to the light sensor.

18 Claims, 4 Drawing Sheets

LIQUID CRYSTAL DISPLAY DEVICE AND METHOD OF FABRICATING THE SAME

This application claims the benefit of Korean Patent Application No. 10-2006-0060086, filed Jun. 30, 2006, which is hereby incorporated by reference for all purposes as if fully set forth herein.

BACKGROUND OF THE INVENTION

1. Field of the Invention

The present invention relates to a liquid crystal display device, and more particularly, to a liquid crystal display device that controls the brightness of a backlight according to the intensity of incident external light, and a method of fabricating the same.

2. Discussion of the Related Art

Today, liquid crystal display (LCD) devices, are more widely used as a next generation display device because they enable a slim and lightweight design and have advantages such as low power consumption, high picture quality and easy mass production.

The LCD device includes a thin film transistor (TFT) array substrate and a color filter array substrate separated by a predetermined distance from each other, a liquid crystal layer between the two substrates, and a backlight providing light to the liquid crystal panel. The LCD device displays an image by adjusting the amount of light passing through the liquid crystal layer using the refractive anisotropy of liquid crystal molecules in the liquid crystal layer.

The backlight wastes power because it produces a constant brightness light to the liquid crystal panel even in a dark environment where not much light is required.

To solve the above problem, a system has been developed in which a light sensor sensing the surrounding brightness controls the brightness of the backlight, thus decreasing the power consumption of the backlight.

The light sensor is typically formed at an edge of the TFT array substrate facing a black matrix of the color filter array substrate, and the black matrix has an opening formed at a region corresponding to the light sensor.

At this time, in order to prevent light from the backlight from leaking through the opening formed in the black matrix, it is necessary that the corresponding liquid crystal of the liquid crystal layer should not pass incident light therethrough. That is, the portion of the liquid crystal layer positioned corresponding to the opening should be in a black state.

However, a voltage may be generated by the light sensor and a common electrode formed on the color filter array substrate to create an electric field that drives the liquid crystal of the liquid crystal layer, thus realizing a gray. In other words, light leakage occurs through the opening formed in the black matrix.

Also, the light sensor senses light passing through the liquid crystal molecules of the liquid crystal layer. If the liquid crystal layer near the light sensor is driven, the characteristic of the light incident into the light sensor may be varied. Therefore, the light sensor may fail to correctly sense the intensity of external light, so that the power of the backlight may be wasted due to a malfunction of the light sensor.

SUMMARY OF THE INVENTION

Accordingly, the present invention is directed to a liquid crystal display device and method of fabricating the same that substantially obviates one or more problems due to limitations and disadvantages of the related art.

An advantage of the present invention is to provide a liquid crystal display device that may control the operation of a backlight according to the surrounding brightness to reduce power consumption, and a method of fabricating the same.

Another advantage of the present invention is to provide a liquid crystal display device that may prevent light leakage that may be generated in forming a light sensor capable of sensing the surrounding brightness, and a method of fabricating the same.

Still another advantage of the present invention is to provide a liquid crystal display device that may prevent a malfunction of the light sensor due to the operation of the liquid crystal, and a method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes: a first substrate and a second substrate each having a display area and a non-display area defined; a liquid crystal layer between the first and second substrates; a light sensor on the first substrate in the non-display area that senses the intensity of external light; a passivation layer on an entire upper surface of the first substrate including the light sensor; and a dummy electrode on the passivation layer at a location corresponding to the light sensor.

In another aspect of the present invention, a method of fabricating a liquid crystal display device, including: providing a first substrate having a display area and a non-display area defined; forming a light sensor on the first substrate in the non-display area to sense the intensity of external light and output an electrical signal; forming a passivation layer on an entire upper surface of the first substrate including the light sensor; and forming a dummy electrode on the passivation layer at a location corresponding to the light sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1A:
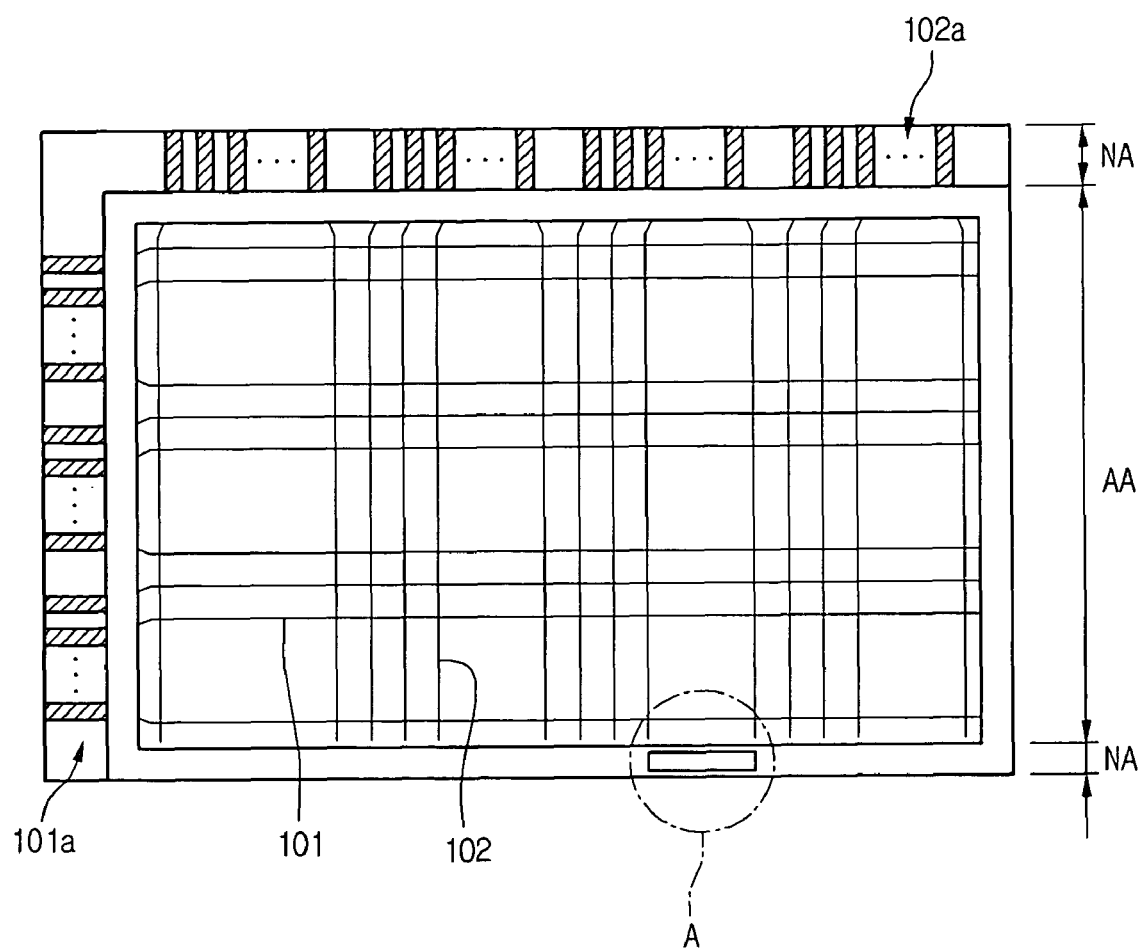
FIGS. 1A to 1C are schematic views for illustrating a liquid crystal display device according to a first embodiment of the present invention.

Reference will now be made in detail to an embodiment of the present invention, examples of which is illustrated in the accompanying drawings.

The invention may, however, be embodied in many different forms and should not be construed as being limited to the embodiments set forth herein; rather, these embodiments are provided so that this disclosure will be thorough and complete, and will fully convey the concept of the invention to those skilled in the art. In the accompanying drawings, the dimensions, thicknesses and the like of layers and regions are exaggerated for clarity. Like reference numerals in the drawings denote like elements, and thus their description will be omitted.

Figure 1B:
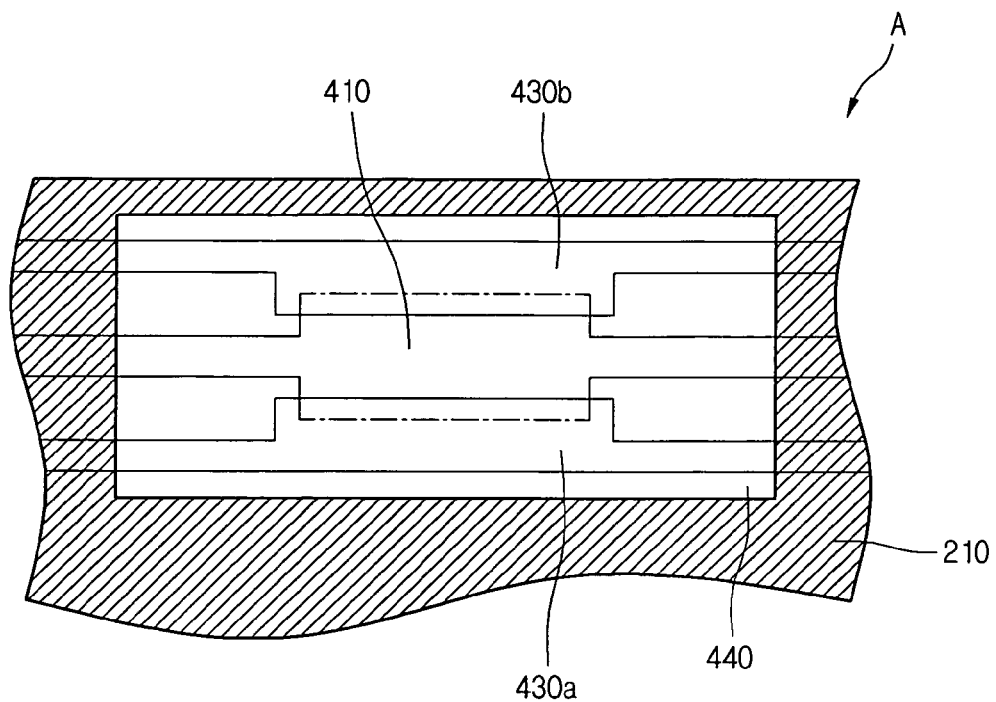
Figure 1C:
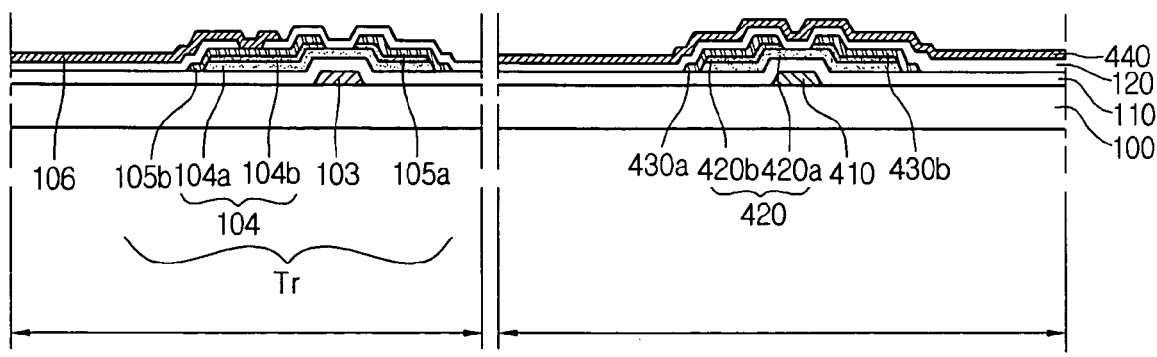

FIGS. 1A to 1C are schematic views for illustrating a liquid crystal display device according to a first embodiment of the present invention. Specifically, FIG. 1A is a plan view of a liquid crystal display device, FIG. 1B is a detailed view of the portion 'A' of FIG. 1A, and FIG. 1C is a partial sectional view of the liquid crystal display device.

Referring to FIGS. 1A to 1C, a liquid crystal display device includes a first substrate 100 and a second substrate 200 each having a display area AA displaying an image and a non-display area NA positioned outside the display area AA, a liquid crystal layer 300 between the first substrate 100 and the second substrate 200, a light sensor 400 formed on the first substrate corresponding to the non-display area NA to sense the intensity of external light, a passivation layer 120 formed on an entire upper surface of the first substrate 100 including the light sensor 400, and a dummy electrode 440 formed on the passivation layer 120 corresponding to the light sensor 400.

At this point, a black matrix 210 is formed on the second substrate 200 corresponding to the non-display area NA. The black matrix 210 has an opening exposing the dummy electrode 440 and the light sensor 400. By doing so, external light is incident into the light sensor 400 through the opening of the black matrix 210.

The dummy electrode 440 prevents the light supplied from a backlight from emitting through the opening by applying a constant driving voltage to the liquid crystal layer positioned near the light sensor 400, i.e., positioned at the opening. In other words, when the liquid crystal display device is in a normally black mode, it always maintains black by not applying the driving voltage to the liquid crystal layer positioned near the light sensor 400. That is, a voltage is applied to the dummy electrode 440 that is the same as that applied to a common electrode 240. The dummy electrode 440 may be electrically connected with the common electrode 240 or a common voltage supply unit (not shown) applying the common voltage to the common electrode 240.

When the liquid crystal display device is in a normally white mode, it always maintains a black state by applying a constant voltage to the liquid crystal layer. That is, the dummy electrode 440 is connected to a separate external voltage supply unit with a constant voltage that is different than that applied to the common electrode 240. By doing so, it can prevent light from leaking through the opening.

Also, because the dummy electrode 440 applies a constant voltage to the liquid crystal layer positioned near the light sensor 400, the intensity of the light passing through the liquid crystal layer does not vary. Thus, because the light incident into the light sensor 400 through the liquid crystal layer has a constant intensity, the light sensor 400 can exactly sense the surrounding brightness.

The dummy electrode 440 should be formed of a transparent conductive material through which light passes. For example, the dummy electrode 440 may be formed of ITO or IZO. The reason is because external light is illuminated into the light sensor 400 through the dummy electrode 440.

A plurality of gate lines 101 and a plurality of data lines 102 cross each other on the first substrate 100 corresponding to the display area AA to define pixels. A gate pad 101a is formed at one end of the plurality of gate lines 101, and a data pad 102a is formed at one end of the plurality of data lines 102. Each of the pads 101a and 102a may be electrically connected with a printed circuit board (PCB) that is an external circuit, in a tape automated bonding (TAB) device using a tape carrier package (TCP).

A gate insulating layer 110 is between the gate lines 101 and the data lines 102. The gate insulating layer 110 may be a silicon nitride layer, a silicon oxide layer and a stacked layer of the silicon nitride layer or the silicon oxide layer.

At least one transistor Tr is formed near a crossing point of the gate lines and the data lines, and a pixel electrode 106 electrically connected with the thin film transistor is also formed.

Herein, the thin film transistor Tr includes a first gate electrode 103 branching from the gate line 101, a first semiconductor layer 104 formed on the first insulating layer 110 corresponding to the first gate electrode 103, and a first source/first drain electrode 105a/105b formed at both edges of the first semiconductor layer 104. The first semiconductor layer 104 may include an active layer 104a made of amorphous silicon, and an ohmic contact layer 104b made of impurity-doped amorphous silicon.

Also, a light sensor 400 sensing the intensity of external light and outputting an electrical signal is formed on the first substrate 100 in the non-display area NA. The brightness of a backlight at the rear of the first substrate 100 may be adjusted according to the electrical signal output from the light sensor 400 to reduce the power consumption of the backlight.

The light sensor 400 includes a second gate electrode 410 formed on the first substrate 100 in the non-display area NA, a gate insulating layer 110 formed on the second gate electrode 410, a second semiconductor layer 420 formed on the second gate insulating layer 110, and a second source/second drain electrode 430a/430b positioned at both edges of the second semiconductor layer 420.

The second semiconductor layer 420 is made of a material whose current characteristic is changed according to the intensity of light impinging on the material, and includes an active layer 420a made of amorphous silicon, and an ohmic contact layer 420b. As the intensity of external light increases, the intensity of current flowing through the second source/second drain electrode 430a/430b increases, whereas as the intensity of external light decreases, the intensity of current flowing through the second source/second drain electrode 430a/430b decreases. Accordingly, the brightness of the backlight can be adjusted according to the intensity of the current flowing through the second source/second drain electrode 430a/430b of the light sensor 400.

Passivation layer 120 is formed on an entire upper surface of the first substrate 100 including the thin film transistor Tr and the light sensor 400. The passivation layer 120 may be made of a silicon nitride layer, a silicon oxide layer and a stacked layer of the silicon nitride layer and the silicon oxide layer.

A pixel electrode electrically connected to the thin film transistor Tr is formed on the passivation layer 120 corresponding to the display area AA. A dummy electrode 440 is formed on the passivation layer 120 in the non-display area NA. The dummy electrode 440 is formed on the passivation layer 120 corresponding to the light sensor 400.

Figure 2A:
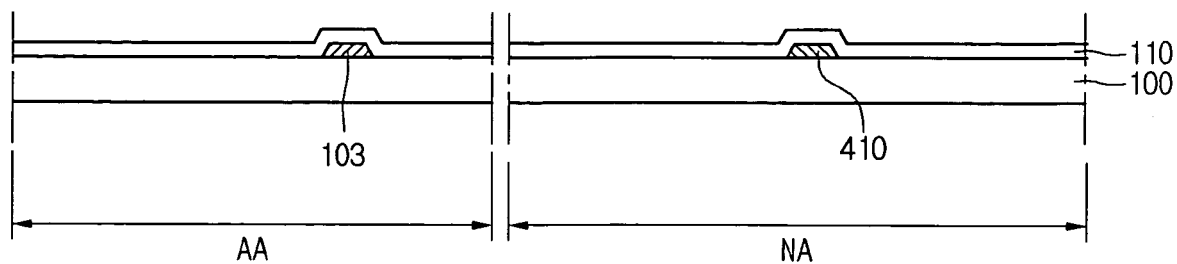
FIGS. 2A to 2D are sectional views for illustrating a method of fabricating a liquid crystal display device according to a second embodiment of the present invention.
Figure 2B:
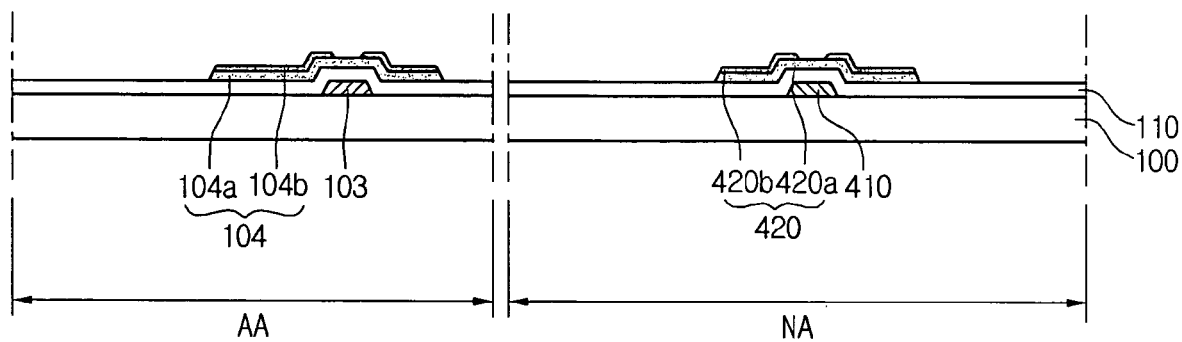
Figure 2C:
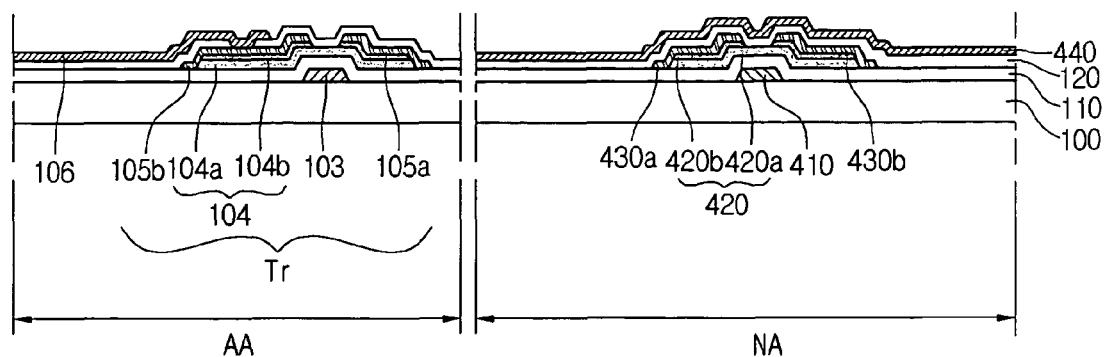
Figure 2D:
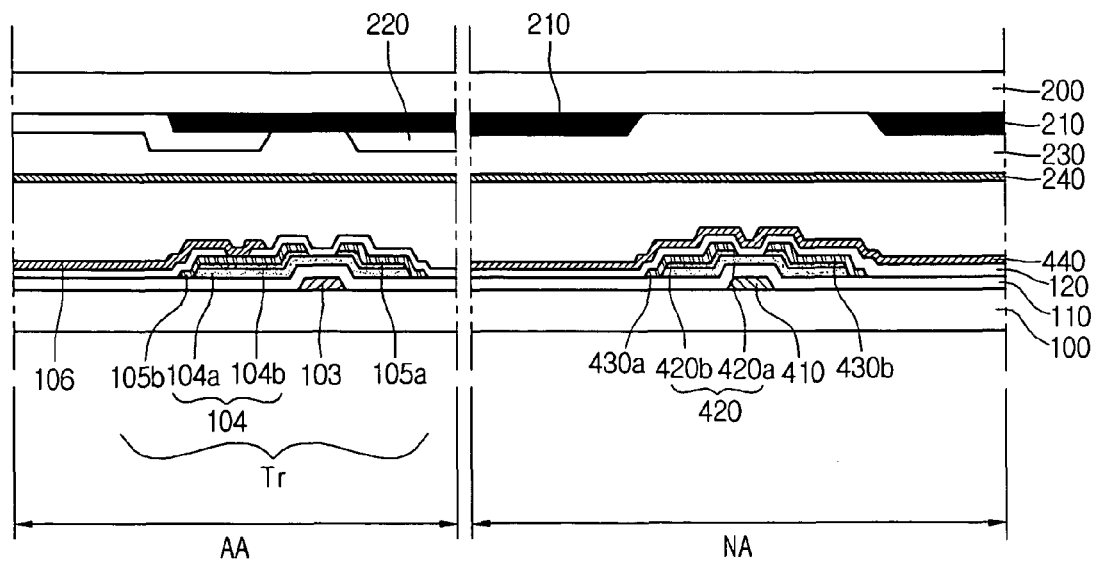

Meanwhile, color filter 220 and black matrix 210 are formed on the second substrate 200 corresponding to the display area AA (FIG. 2D). The color filter 220 is arranged so as to correspond to a light transmission region of the pixel region of the first substrate 100, and the black matrix 210 is arranged to correspond to a boundary between the pixel regions and a light non-transmission region of the pixel region. Herein, the non-transmission region is a region where the gate line, the data line and the thin film transistor are formed.

Also, to overcome a stepped height formed due to the color filter 220 and the black matrix 210, an overcoat layer 230 can be further formed. A transparent common electrode 240 is formed on the overcoat layer 230.

The black matrix 210 may also be formed on the second substrate 200 corresponding to the non-display area NA. The black matrix 210 has an opening exposing the light sensor 400 such that external light is incident into the light sensor 400 through the opening.

FIGS. 2A to 2D are sectional views for illustrating a method of fabricating a liquid crystal display device according to a second embodiment of the present invention.

Referring to FIG. 2A, a first substrate 100 having a display area AA and a non-display area NA defined is provided.

A first conductive layer is formed on the first substrate 100 and is then patterned to form a first gate electrode 101 and a second gate electrode 410. At this time, the first gate electrode 101 is formed in a region corresponding to the display area AA, and the second gate electrode 410 is formed on a region corresponding to the non-display area NA.

The first conductive layer may be formed by a sputtering method or a vacuum evaporation method. The first conductive layer may be formed of Al, Mo, Cu, AlNd, Ti, Ca, Ni or an alloy thereof.

A gate insulating layer 110 is formed on an entire upper surface of the first substrate 100 including the first gate electrode 101 and the second gate electrode 410.

The gate insulating layer 110 may be a silicon nitride layer, a silicon oxide layer or a stacked layer or the silicon nitride layer and the silicon oxide layer. The gate insulating layer 110 may be formed by a chemical vapor deposition (CVD) method or a vacuum evaporation method.

Referring to FIG. 2B, a first semiconductor layer 102 and a second semiconductor layer 420 are formed on the gate insulating layer 110 corresponding to the first gate electrode 101 and the second gate electrode 410, respectively. The first semiconductor layer 102 may include an active layer 102a made of amorphous silicon and an ohmic contact layer 102b made of impurity doped amorphous silicon.

Also, the second semiconductor layer 420 may be formed of an amorphous silicon layer whose current characteristic varies depending on the intensity of the light impinging on the layer.

The first semiconductor layer 102 and the second semiconductor layer 420 may be formed by a CVD method or a sputtering method. The first semiconductor layer 102 and the second semiconductor layer 420 may be formed at the same time by a patterning process using a halftone mask or a diffraction mask.

Referring to FIG. 2C, a second conductive layer is formed and patterned on an entire upper surface of the first substrate including the first and second semiconductor layers 102 and 410 to form first source/first drain electrodes 104a/104b at both edges of the first semiconductor layer 102 and second source/second drain electrodes 430a/430b at both edges of the second semiconductor layer 420.

The second conductive layer may be formed of Al, Mo, Cu, AlNd, Ti, Ca, Ni or an alloy thereof. The second conductive layer may be formed by a chemical vapor deposition (CVD) method or a vacuum evaporation method.

By the above processes, the thin film transistor Tr and the light sensor 400 may be formed on the first substrate 100.

Thereafter, a passivation layer 120 is formed on an entire upper surface of the first substrate 100 including the thin film transistor Tr and the light sensor 400. The passivation layer 120 may be a silicon nitride layer, a silicon oxide layer or a stacked layer of the silicon nitride layer and the silicon oxide layer. The passivation layer 120 may be formed by a CVD method or a sputtering method. Next, a contact hole exposing the first drain electrode 104b of the thin film transistor Tr is formed in the passivation layer 120.

A third conductive layer is formed and patterned on an entire upper surface of the first substrate 100 including the thin film transistor Tr and the light sensor 400 to form a pixel electrode 105 electrically connected to the thin film transistor Tr, and a dummy electrode 440 positioned over the light sensor 400. The third conductive layer may be formed of a transparent conductive material, for example, ITO or IZO. The third conductive layer may be formed by a sputtering method or a vacuum evaporation method.

Further, when the liquid crystal display device is in a normally white mode, the dummy electrode 440 is electrically connected with a separate external voltage supply unit such that a voltage different than that applied to the common electrode 240 is applied to the dummy electrode 440. When the liquid crystal display device is in a normally black mode, the dummy electrode 440 is electrically connected with the common electrode 240 or the common voltage supply unit such that a voltage that is the same as that applied to the common electrode 240 is applied to the dummy electrode 440. This prevents light supplied from the backlight from being emitted by applying a constant driving voltage to the liquid crystal layer positioned on the light sensor 400 to always realize black and hence block light from the backlight.

Meanwhile, referring to FIG. 2D, a second substrate 200 on which a color filter 220 and a black matrix 210 are formed is provided. An overcoat layer 230 may be further formed on the color filter 220 and the black matrix 210. Also, a common electrode 240 is formed on the overcoat layer 230. The common electrode 240 may be formed of a transparent electrode material, for example, ITO or IZO.

Next, a seal pattern is formed in the non-display are NA of the first substrate 100 or the second substrate 200. Then, the first substrate 100 and the second substrate 200 are attached and a liquid crystal layer 500 is formed between the first substrate 100 and the second substrate 200.

Although not shown in the drawings, a process of assembling the attached first and second substrates 100 and 200 with the backlight that provides light to the first and second substrates 100 and 200 using a supporting bar and a top case is performed to fabricate a liquid crystal display device.

By doing so, it is possible to fabricate a liquid crystal display device that may sense the intensity of external light through the light sensor 400 formed on the first substrate 100 and control the brightness of the backlight according to the surrounding brightness sensed by the light sensor to reduce the power consumption.

Also, a constant driving voltage is applied to the liquid crystal layer positioned near the light sensor 400 such that a region of the liquid crystal layer corresponding to the opening formed in the black matrix always realizes black, thus preventing light from leaking.

In addition, because the constant driving voltage is applied to the liquid crystal layer positioned near the light sensor 400, the characteristic of the light passing through the liquid crystal layer is always constant, and thus the light sensor 400 may precisely sense variations in the surrounding brightness.

As described above, the power consumption of the liquid crystal display device may be reduced by controlling the brightness of the backlight according to the intensity of external light to reduce the power consumption of the backlight.

Also, a constant driving voltage is applied to the liquid crystal layer positioned near the light sensor, thereby allowing the light sensor to precisely sense the intensity of external light.

Moreover, because the opening formed in the black matrix always realizes black, the leakage of light from the backlight through the opening may be prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
    a first substrate and a second substrate each having a display area and a non-display area defined;
    a liquid crystal layer between the first and second substrates;
    a light sensor on the first substrate in the non-display area that senses the intensity of external light;
    a passivation layer on an entire upper surface of the first substrate including the light sensor; and
    a dummy electrode on the passivation layer at a location corresponding to the light sensor and insulated from the light sensor with the passivation layer.

2. The liquid crystal display device according to claim 1, wherein the dummy electrode is formed of a transparent conductive material.

3. The liquid crystal display device according to claim 1, wherein the dummy electrode is formed of one of ITO and IZO.

4. The liquid crystal display device according to claim 1, further comprising a black matrix positioned on the second substrate in the non-display area and having an opening exposing the light sensor.

5. The liquid crystal display device according to claim 1, wherein when the liquid crystal display device is in a normally white mode, a constant voltage is applied to the dummy electrode that is different than the voltage applied to a common electrode.

6. The liquid crystal display device according to claim 1, wherein when the liquid crystal display device is in a normally black mode, a voltage is applied to the dummy electrode that is the same as the voltage applied to a common electrode.

7. The liquid crystal display device according to claim 1, wherein the light sensor includes a thin film transistor having a semiconductor layer whose current characteristic varies according to the intensity of light impinging on the semiconductor layer.

8. The liquid crystal display device according to claim 1, further comprising a backlight whose brightness is controlled depending on an output signal from the light sensor.

9. A method of fabricating a liquid crystal display device, comprising:
    providing a first substrate having a display area and a non-display area defined;
    forming a light sensor on the first substrate in the non-display area to sense the intensity of external light and output an electrical signal;
    forming a passivation layer on an entire upper surface of the first substrate including the light sensor; and
    forming a dummy electrode on the passivation layer at a location corresponding to the light sensor and insulated from the light sensor with the passivation layer.

10. The method according to claim 9, wherein the dummy electrode is formed of a transparent conductive material.

11. The method according to claim 9, wherein the dummy electrode is formed of one of ITO and IZO.

12. The method according to claim 9, further comprising:
    providing a second substrate having a display area and a non-display area and having a black matrix formed in the non-display area of the second substrate; and
    attaching the first substrate and the second substrate,
    wherein the black matrix has an opening exposing the light sensor.

13. The method according to claim 9, wherein a thin film transistor and a pixel electrode electrically connected with the thin film transistor are formed on the first substrate in the display area.

14. The method according to claim 13, wherein the pixel electrode and the dummy electrode are formed of the same conductive material in the same layer.

15. The method according to claim 9, wherein when the liquid crystal display device is in a normally white mode, the dummy electrode is electrically connected with a separate external voltage supply unit.

16. The method according to claim 9, wherein when the liquid crystal display device is in a normally black mode, the dummy electrode is electrically connected with one of a common electrode and a common voltage supply unit.

17. The method according to claim 9, wherein the light sensor includes thin film transistor having a semiconductor layer whose current characteristic varies according to the intensity of light impinging on the semiconductor layer.

18. The method according to claim 9, further comprising assembling a backlight whose operation is controlled depending on an output signal from the light sensor.

* * * * *